(12) United States Patent
Kim et al.

(10) Patent No.: US 12,197,234 B2
(45) Date of Patent: Jan. 14, 2025

(54) RECONNAISSANCE UNMANNED AERIAL VEHICLE AND SURVEILLANCE FLIGHT METHOD THEREOF

(71) Applicant: ELECTRONICS AND TELECOMMUNICATIONS RESEARCH INSTITUTE, Daejeon (KR)

(72) Inventors: Young Il Kim, Sejong-si (KR); Seong Hee Park, Daejeon (KR); Soon Yong Song, Sejong-si (KR); Geon Min Yeo, Daejeon (KR); Il Woo Lee, Daejeon (KR); Wun Cheol Jeong, Daejeon (KR); Tae Wook Heo, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 470 days.

(21) Appl. No.: 17/381,385

(22) Filed: Jul. 21, 2021

(65) Prior Publication Data
US 2022/0075392 A1 Mar. 10, 2022

(30) Foreign Application Priority Data

Jul. 22, 2020 (KR) .................. 10-2020-0091200
Apr. 5, 2021 (KR) .................. 10-2021-0043825

(51) Int. Cl.
*G05D 1/00* (2024.01)
*B64C 39/02* (2023.01)
(Continued)

(52) U.S. Cl.
CPC ........... *G05D 1/104* (2013.01); *G05D 1/0094* (2013.01); *G06F 7/588* (2013.01); *G07C 5/008* (2013.01);
(Continued)

(58) Field of Classification Search
CPC ...... G05D 1/104; G05D 1/0094; G05D 1/101; B64C 39/024; B64D 47/08; G06F 7/588;
(Continued)

(56) References Cited

U.S. PATENT DOCUMENTS 7,581,702 B2     9/2009  Olson et al.
2009/0219393 A1* 9/2009  Vian ................... G08G 5/0086
                                                          701/25
(Continued)

FOREIGN PATENT DOCUMENTS

JP          5214599 B2      6/2013
KR   10-2018-0076582 A      7/2018
(Continued)

OTHER PUBLICATIONS

KIPO Office Action, dated May 30, 2022, for Korean Patent Application No. 10-2021-0043825 which corresponds to the above-identified U.S. application.

*Primary Examiner* — Anne Marie Antonucci
*Assistant Examiner* — Wesam Almadhrhi
(74) *Attorney, Agent, or Firm* — LRK PATENT LAW FIRM

(57) ABSTRACT

A reconnaissance UAV and a surveillance flight method of the reconnaissance UAV which can reduce a number of required reconnaissance UAVs are provided. The surveillance flight method for detecting an unauthorized UAV includes: defining multiple flight passages in a UAV no-fly zone for a plurality of reconnaissance UAVs; controlling each of the plurality of reconnaissance UAVs to fly across adjacent flight passages at an interval by crossing a border of the adjacent flight passages; and controlling at least one of an image sensor and a noise sensor mounted on the reconnaissance UAV to dynamically change a direction detection thereof.

8 Claims, 11 Drawing Sheets

[Continuous path-based Flight Scheme]

(51) Int. Cl.
*B64D 47/08* (2006.01)
*G06F 7/58* (2006.01)
*G07C 5/00* (2006.01)
*G07C 5/08* (2006.01)
*H04R 1/32* (2006.01)
*H04W 4/40* (2018.01)
*B64U 101/31* (2023.01)

(52) U.S. Cl.
CPC ............ *G07C 5/0808* (2013.01); *H04R 1/326* (2013.01); *H04W 4/40* (2018.02); *B64U 2101/31* (2023.01); *B64U 2201/00* (2023.01); *H04R 2499/13* (2013.01)

(58) Field of Classification Search
CPC ...... G07C 5/008; G07C 5/0808; H04R 1/326; H04R 2499/13; H04W 4/40; H04W 4/029; H04W 4/44; H04W 12/086; H04W 12/122; H04W 12/63; B64U 2101/30; B64U 2101/00; B64U 2201/00
See application file for complete search history.

(56) References Cited

U.S. PATENT DOCUMENTS

| | | | |
|---|---|---|---|
| 2014/0172194 A1* | 6/2014 | Levien | G05D 1/0027 |
| | | | 701/2 |
| 2014/0316616 A1* | 10/2014 | Kugelmass | G06T 11/206 |
| | | | 701/8 |
| 2016/0107749 A1 | 4/2016 | Mucci | |
| 2017/0094527 A1 | 3/2017 | Shatti et al. | |
| 2019/0174149 A1* | 6/2019 | Zhang | H04N 7/18 |
| 2020/0011670 A1 | 1/2020 | Guangzhou | |
| 2020/0084540 A1* | 3/2020 | John | G05D 1/0016 |
| 2023/0105120 A1* | 4/2023 | Rose | G08G 5/0013 |
| | | | 701/2 |

FOREIGN PATENT DOCUMENTS

| | | |
|---|---|---|
| KR | 10-2018-0085562 A | 7/2018 |
| KR | 10-2019-0023633 A | 3/2019 |
| KR | 10-2020-0079180 A | 7/2020 |

* cited by examiner

[Continuous path-based Flight Scheme]

[Random path-based Flight Scheme]

RECONNAISSANCE UNMANNED AERIAL VEHICLE AND SURVEILLANCE FLIGHT METHOD THEREOF

CROSS-REFERENCE TO RELATED APPLICATIONS

The present application claims priority to Korean Patent Application No. 10-2020-0091200 filed on Jul. 22, 2020 and No. 10-2021-0043825 filed on Apr. 5, 2021 with the Korean Intellectual Property Office (KIPO), the entire contents of which are incorporated herein by reference.

BACKGROUND

1. Technical Field

The present disclosure relates to an unmanned aerial vehicle (UAV) and a flight method of the UAV and, more particularly, to a reconnaissance UAV for detecting a dedicated target and a surveillance flight method of the reconnaissance UAV.

2. Description of Related Art

Small-sized unmanned aerial vehicles (UAV), which are referred to as drones also, have caused social anxiety by frequent intrusions into airports, public places, and other protected areas. In particular, the possibility of an attack by a UAV capable of being used for military purposes has become a threat to a social security. Accordingly, researches developments for defending the UAVs to protect human lives and properties from the UAVs are in progress.

Technologies applicable to detecting the small-sized UAVs may include a radar detection, an image-based detection, and a noise-based detection. However, all of these methods cannot effectively detect the UAV since the size of the UAV is usually so small. In particular, a UAV image detector which detects the UAV based on an image analysis cannot detect the UAV because a small-sized UAV may occupy little area in an image captured from a distance. When a zoom lens is used for each camera detecting the UAV to increase the size of a UAV portion in the captured image, the number of required cameras increases significantly, which is economically disadvantageous.

SUMMARY

To solve the above problem, provided is a method for efficiently monitoring a UAV no-fly zone by a reconnaissance UAV equipped with an image sensor and a noise sensor.

Provided is a reconnaissance UAV capable of monitoring the UAV no-fly zone in real-time through a camera and a noise sensor to protect a specific area from an intrusion of an authorized UAV by analyzing an image and a noise of the unauthorized UAV and a surveillance flight method using the reconnaissance UAV.

Provided is a reconnaissance UAV and a surveillance flight method which can effectively detect a target even when the target is so small that a size of the target in an image acquired in a distance is too small, a noise level of the target is too low, and a probability of detecting the target by an artificial intelligence trained by a machine learning algorithm is low.

Provided is a reconnaissance UAV and a surveillance flight method which allows to reduce a number of the reconnaissance UAVs required for effectively monitoring the UAV no-fly zone by use of the reconnaissance UAVs equipped with respective image and noise sensors.

In accordance with an aspect of an exemplary embodiment, a surveillance flight method of a reconnaissance UAV for detecting an unauthorized UAV includes: defining multiple flight passages in a UAV no-fly zone for a plurality of reconnaissance UAVs; controlling each of the plurality of reconnaissance UAVs to fly across adjacent flight passages at a regular interval by crossing a border of the adjacent flight passages; and controlling at least one of an image sensor and a noise sensor mounted on the reconnaissance UAV to dynamically change a direction detection of at least one of the sensors.

The surveillance flight method of claim 1 may further include: transmitting, by a master reconnaissance UAV among the plurality of reconnaissance UAVs to a member reconnaissance UAV other than the master reconnaissance UAV, a beacon message including an identification number of the master reconnaissance UAV, a PN sequence required to synchronize a timing of the master reconnaissance UAV with a timing of the member reconnaissance UAV, a number of the reconnaissance UAVs currently performing an surveillance operation in the UAV no-fly zone, a monitoring period, flight schemes and flight path positions of the plurality of reconnaissance UAVs; and receiving, by the master reconnaissance UAV from the member reconnaissance UAV during an uplink interval, a status reporting message including an identification number, the position, a maximum flight speed, a battery usage, types of mounted sensors, the flight scheme, and the flight path position of the member reconnaissance UAV.

The surveillance flight method of claim 2, may further include: generating a flight schedule, by the master reconnaissance UAV, including a mission or the flight scheme and the flight path of the member reconnaissance UAV based on information received from the member reconnaissance UAV to transmit to the member reconnaissance UAV.

In accordance with another aspect of an exemplary embodiment, a reconnaissance UAV for detecting an unauthorized UAV includes: an image sensor including at least one of an optical camera, a digital camera, a thermal imaging camera, and a combination thereof; a noise sensor including a microphone, an acceleration sensor, or a combination thereof; an actuator configured to control a position of at least one of the image sensor and the noise sensor; a wireless communication device configured to communicate with another reconnaissance UAV or a ground control center; and a controller configured to control an operation of the reconnaissance UAV to fly along a predetermined flight path in a UAV no-fly zone, control operations of the image sensor, the noise sensor, the actuator, and the wireless communication device, and detect the unauthorized UAV in the UAV no-fly zone based on the information collected through the image sensor or the noise sensor In one embodiment, the controller may include: a message receiver configured to receive a status reporting message from a member reconnaissance UAV other than a master reconnaissance UAV among a plurality of reconnaissance UAVs; a flight schedule generator configured to generate a flight schedule of the member reconnaissance UAV based on the status reporting message; a monitoring period setter configured to set a monitoring period for performing the reconnaissance flight in the UAV no-fly zone; a message transmitter configured to broadcast the flight schedule and the monitoring period through a beacon message; and an updater configured to update the flight schedule based on the status reporting message from the member reconnaissance UAV during the monitoring period.

In another embodiment, the controller may include: a message receiver configured to receive a beacon message from a master reconnaissance UAV among a plurality of reconnaissance UAVs; a message transmitter configured to transmit the status reporting message including information about the reconnaissance UAV to the master reconnaissance UAV; a flight schedule extractor configured to extract the flight schedule from the beacon message received from the master reconnaissance UAV; and a monitoring period setter configured to set a monitoring period for performing the reconnaissance flight based on the beacon message.

The controller may set a role of the reconnaissance UAV as the master reconnaissance UAV in case of receiving the beacon message within a preset time when the reconnaissance UAV first enters the UAV no-fly zone. Contrarily, the controller may set the role of the reconnaissance UAV as the member reconnaissance UAV in case of not receiving the beacon message within a preset time when the reconnaissance UAV first enters the UAV no-fly zone.

The reconnaissance UAV may further include: a cooperative flight controller configured to control a cooperative flight of a plurality of reconnaissance UAVs and including a virtual segmentation border determiner suitable for setting at least one virtual segmentation border to divide the UAV no-fly zone into a plurality of monitoring areas.

The cooperative flight controller may include: a random number generator configured to generate a random number for setting grids or monitoring positions for sequentially monitoring each of the monitoring areas divided by the virtual segmentation border; and a mapper configured to map the random number to an occupancy time for monitoring the grids or the monitoring positions.

In accordance with an aspect of another exemplary embodiment, a surveillance flight method of a reconnaissance UAV for detecting an unauthorized UAV includes: setting a detection area of one or more of an image sensor and a noise sensor of the reconnaissance UAV as a unit monitoring area; setting a time during which the reconnaissance UAV stays over the unit monitoring area as a unit flight duration; dividing a UAV monitoring area over which the reconnaissance UAV will fly into the unit monitoring areas and establish a monitoring grid; generating a random number for randomize the unit monitoring area and the unit flight duration; and mapping the random number to the monitoring grid.

The random number may be mapped to an altitude, latitude, and velocity of the reconnaissance UAV at a next position based on the altitude, latitude, and speed at a current position.

The surveillance flight method may further include: establishing a wireless communication link to enable a cooperation between the reconnaissance UAV and another reconnaissance UAV; and determining a role of one of the reconnaissance UAV and the other reconnaissance UAV as a master reconnaissance UAV, and determining a role of a remaining reconnaissance UAV as a member reconnaissance UAV. The master reconnaissance UAV may determine a mission or flight path of each reconnaissance UAV based on a sensor performance, a flight duration capability, and a computational capability of each reconnaissance UAV.

In accordance with an aspect of another exemplary embodiment, a surveillance flight method of a reconnaissance UAV for detecting an unauthorized UAV may include: variably determining a monitoring period for a UAV no-fly zone according to a number of reconnaissance UAVs; determining one reconnaissance UAV satisfying predetermined requirements among a plurality of reconnaissance UAVs as a master reconnaissance UAV while determining a remaining reconnaissance UAV other than the master reconnaissance UAV as a member reconnaissance UAV so that the master reconnaissance UAV assigns a mission to the member reconnaissance UAV; and transmitting, by the master reconnaissance UAV to the member reconnaissance UAV, a beacon message including an identification number of the master reconnaissance UAV, a PN sequence required to synchronize a timing of the master reconnaissance UAV with a timing of the member reconnaissance UAV, a number of the reconnaissance UAVs currently performing an surveillance operation in the UAV no-fly zone, a monitoring period, flight schemes and flight path positions of the plurality of reconnaissance UAVs.

The member reconnaissance UAV may analyze the beacon message and transmit a status reporting message including an identification number, the position, a maximum flight speed, a battery usage, types of mounted sensors, the flight scheme, and the flight path position of the member reconnaissance UAV to the master reconnaissance UAV during an uplink interval.

The surveillance flight method may further include: calculating, by the master reconnaissance UAV, flight paths of all the member reconnaissance UAVs in the UAV no-fly zone itself The surveillance flight method may further include: determining, by the master reconnaissance UAV, flight paths of the member reconnaissance UAVs with reference to preliminary flight path information of the member reconnaissance UAV calculated by corresponding member reconnaissance UAV in a distributed manner.

Each reconnaissance UAV first entering the UAV no-fly zone may wait for a receipt of the beacon message for a predetermined time, determine itself as the master reconnaissance UAV if no beacon message is received for the predetermined time, and generate and transmit the beacon message.

The surveillance flight method may further include: continually receiving the beacon message, by the member reconnaissance UAV, to update the flight path of the member reconnaissance.

The surveillance flight method may further include: determining, by the master reconnaissance UAV, at least one virtual segmentation border in the UAV no-fly zone to divide a UAV no-fly zone into a plurality of monitoring areas; and generating a random number to determine a flight path and a flight duration of the member reconnaissance UAV according to the random number.

In accordance with an aspect of another exemplary embodiment, a method of controlling a surveillance flight of a reconnaissance UAV for detecting an unauthorized UAV by a ground control center or an UAV detection device of the ground control center includes: determining at least one virtual segmentation border in the UAV no-fly zone to divide the UAV no-fly zone into a plurality of monitoring areas based on a size and location of the UAV no-fly zone and a number of reconnaissance UAVs in the UAV no-fly zone; allocating each of the monitoring areas to at least one reconnaissance UAV; and determining a flight scheme of the reconnaissance UAV for each monitoring area to be a grid scheme or a random walk scheme. In the grid scheme, at least one of the monitoring areas is divided into a plurality of grids of a certain size, the reconnaissance UAV is placed into one of the plurality of grids selected randomly so that the reconnaissance UAV monitors a randomly selected grid, and then the reconnaissance UAV is placed into another one of the plurality of grids selected randomly again.

According to an exemplary embodiment of the present disclosure, the reconnaissance UAV equipped with the image sensor and the noise sensor enables to overcome the limitation of the sensors fixed on the ground and can protect human lives and properties from unauthorized UAVs intruding the UAV no-fly zone or UAV-protected zone.

Also, the present disclosure allows to reduce costs and the number of the reconnaissance UAVs required to monitor the UAV-protected area and increase a monitoring efficiency by implementing communications between the reconnaissance UAVs and cooperative flight schemes and flight paths.

BRIEF DESCRIPTION OF THE DRAWINGS

In order that the disclosure may be well understood, there will now be described various forms thereof, given by way of example, reference being made to the accompanying drawings, in which.

Figure 1:
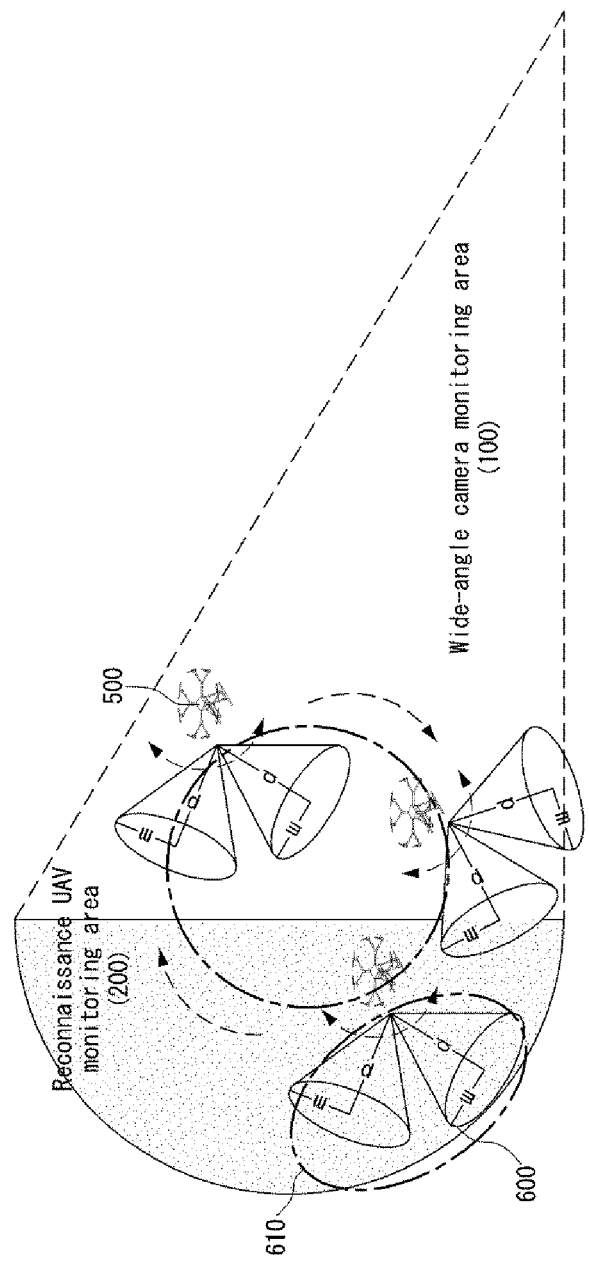
FIG. 1 is an illustration of a UAV detection area of a reconnaissance UAV according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In the following description and the drawings, similar or corresponding components may be designated by the same or similar reference numerals to facilitate an overall understanding of the present disclosure and replicate description of them will be omitted for simplicity.

FIG. 1 is an illustration of a UAV detection area of a reconnaissance UAV according to an exemplary embodiment of the present disclosure.

According to the present disclosure, a reconnaissance unmanned aerial vehicle (UAV) performs a reconnaissance flight over a certain UAV no-fly zone and acquires and analyzes an image of an unauthorized UAV and a noise from the unauthorized UAV to protect a human life and physical assets from the unauthorized UAV intruding the UAV no-fly zone. In particular, the present disclosure enables to reduce a number of the reconnaissance UAV required to detect the unauthorized UAV and efficiently monitor the protected area.

Referring to FIG. 1, a UAV no-fly zone according to the present embodiment may be divided into a wide-angle camera monitoring area 100 located close to a certain origin and a reconnaissance UAV monitoring area 200 located farther from the origin than the wide-angle camera monitoring area 100. The reconnaissance UAV 500 may include at least one sensor having a unit detection area 600 and configured to rotate during a flight so that a detection area 610 of the reconnaissance UAV is expanded.

Figure 2:
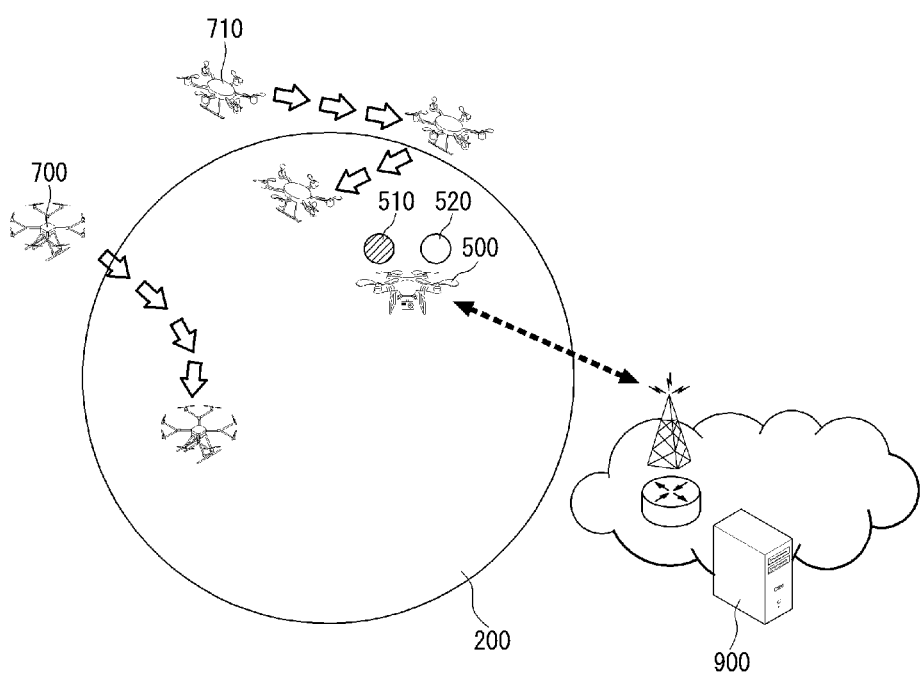
FIG. 2 illustrates a concept of detecting an intruding UAV using the reconnaissance UAV according to an exemplary embodiment of the present disclosure.

FIG. 2 illustrates a concept of detecting an intruding UAV using the reconnaissance UAV according to an exemplary embodiment of the present disclosure.

In the present embodiment, the reconnaissance UAV 500 may include an image sensor 510 and a noise sensor 520. The reconnaissance UAV 500 may acquire image and noise data of the unauthorized UAVs 700 and 710 appearing within a certain search distance in the reconnaissance UAV monitoring area 200 through the image sensor 510 and the noise sensor 520. The reconnaissance UAV 500 may directly analyze the image and noise data to detect the intrusion of the unauthorized UAV 700 or 710. Alternatively, the reconnaissance UAV 500 may transmit the image and noise data to an Internet-of-things (IoT)-based drone detection device 900 located on a ground to allow the IoT-based drone detection device 900 to determine the intrusion and type of the unauthorized UAV 700 or 710.

The IoT-based drone detection device 900 may include a communication device that may communicate with the sensor mounted on the reconnaissance UAV 500 through a wireless link and with a sensor installed on the ground through a network such as the Internet. Also, the IoT-based drone detection device 900 may include a controller suitable for analyzing received data or information to provide analyzed information to a user and remotely control the reconnaissance UAV 500 based on learned information of an artificial intelligence. Further, the IoT-based drone detection device 900 may be connected to shared computer processing resources or a distributed computing system through a network so as to utilize external computing resources such as a cloud storage and an external computing power when needed.

The reconnaissance UAV according to an exemplary embodiment of the present disclosure may define a plurality of flight passages in the UAV no-fly zone and cross a border of adjacent flight passages to fly across the adjacent flight passages at a regular interval. During a reconnaissance flight, the reconnaissance UAV may dynamically change a detection direction or position of one or more of the image sensor and the noise sensor mounted on the reconnaissance UAV.

In case that a plurality of reconnaissance UAVs are operated in the system, each reconnaissance UAV may be assigned a role as a master or a member when the reconnaissance UAV first enters the UAV no-fly zone. One of the plurality of reconnaissance UAVs may be set as the master reconnaissance UAV while the others may be set as the member reconnaissance UAVs. The role as the master reconnaissance UAV or the member reconnaissance UAV may be changed later as well.

The master reconnaissance UAV may provide the other reconnaissance UAVs, i.e. the member reconnaissance UAVs with information including at least one of an identification code of the master reconnaissance UAV, a pseudo-noise (PN) sequence code required for a timing synchronization of a wireless communication link between the master reconnaissance UAV and the member reconnaissance UAVs, a number of the reconnaissance UAVs currently performing a reconnaissance mission in the UAV no-fly zone, a monitoring period, a flight scheme and a flight path of the reconnaissance UAVs through a beacon message.

The member reconnaissance UAV may analyze the beacon message from the master reconnaissance UAV and send reconnaissance UAV information or report information including an identification code, a position, a maximum flight speed, a battery usage, a type of each installed sensor, the flight scheme and the flight path of the member reconnaissance UAV to the master reconnaissance UAV through an uplink channel. The master reconnaissance UAV may generate a flight schedule of each of the member reconnaissance UAVs including a mission or the flight scheme and the flight path of the member reconnaissance UAV based on the information from the corresponding member reconnaissance UAV and transmit the flight schedule to the member reconnaissance UAV.

Figure 3:
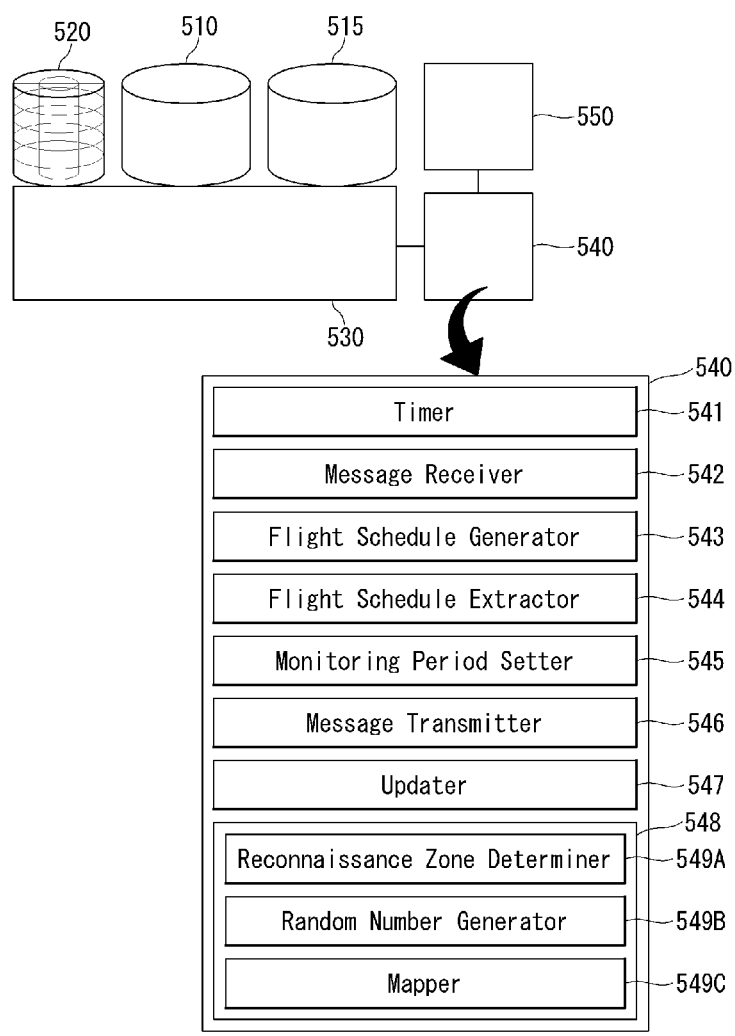
FIG. 3 is a block diagram of the reconnaissance UAV according to an exemplary embodiment of the present disclosure.

FIG. 3 is a block diagram of the reconnaissance UAV according to an exemplary embodiment of the present disclosure.

The reconnaissance UAV shown in the drawing may include a first camera 510, a second camera 515, a noise sensor 520, an actuator 530, a controller 540, and a wireless communication device 550. The first camera 510 may include an optical camera, and the second camera 515 may include a thermal imaging camera for capturing images at night. The first camera 510 and the second camera 515 may be included in the image sensor.

The noise sensor 520, which is a microphone, may include a transducer that receives an external noise and converts the noise into an electrical signal. The noise sensor 520 may output the converted noise signal in a form of digital data or an analog signal.

The actuator 530 may include at least one motor for controlling displacements and rotation of the sensors such as the cameras 510 and 515 and the noise sensor 520. Examples of the motors may include pan-tilt-zoom (PTZ) motors for the first camera 510.

The controller 540 controls overall operations of the reconnaissance UAV according to a prescribed policy or a program installed in the reconnaissance UAV. In detail, the controller 540 controls the sensors mounted on the reconnaissance UAV and performs the detection of the unauthorized UAV based on the signals acquired by the sensors. The controller 540 performs communications with a ground control center or a UAV detection device in the ground control center through the wireless communication device 550. The control device 540 may include a microprocessor or another kind of processor.

The wireless communication device 550 may be connected to a wireless network such as a mobile communication network or a satellite network to transmit or receive signals and data.

The controller 540 will be described in more detail. The controller 540 may include a timer 541, a message receiver 542, a flight schedule generator 543, a flight schedule extractor 544, a monitoring period setter 545, a message transmitter 546, an updater 547, and a cooperative flight controller 548. The configuration of the controller 540 may differ according to an operating mode of the reconnaissance UAV, that is, depending on whether the reconnaissance UAV is set to perform the role of the master reconnaissance UAV or the role of the member reconnaissance UAV.

The timer 541 is used to determine whether there is an existing reconnaissance UAV for assigning the role of the reconnaissance UAV when the reconnaissance UAV first enters the UAV no-fly zone. In detail, if the reconnaissance UAV receives the beacon message from the master reconnaissance UAV within a preset time counted by the timer 541 after the reconnaissance UAV first enters the UAV no-fly zone, the role of the reconnaissance UAV is set as the master reconnaissance UAV. Contrarily, if the reconnaissance UAV does not receive the beacon message from the master reconnaissance UAV within the preset time counted by the timer 541 after the reconnaissance UAV first enters the UAV no-fly zone, the role of the reconnaissance UAV is set as the member reconnaissance UAV.

The message receiver 542 receives the beacon message from another reconnaissance UAV. In case that the reconnaissance UAV is the member reconnaissance UAV, the message receiver 542 may receive the beacon message from the master reconnaissance UAV. In case that the reconnaissance UAV is the master reconnaissance UAV, the message receiver 542 may receive a status reporting message from the member reconnaissance UAV during an uplink interval.

The flight schedule generator 543, which may be provided only for the master reconnaissance UAV though the present disclosure is not limited to, may generate a flight schedule of the master reconnaissance UAV itself and the member reconnaissance UAV based on the status reporting message from the member reconnaissance UAV.

The flight schedule extractor 544, which may be provided only for the member reconnaissance UAV though the present disclosure is not limited to, may extract the flight schedule from the beacon message received from the master reconnaissance UAV.

The monitoring period setter 545 may set the monitoring period according to which the master reconnaissance UAV or the member reconnaissance UAV performs the reconnaissance flight in the UAV no-fly zone.

The message transmitter 546 transmits the beacon message to another reconnaissance UAV. In case that the reconnaissance UAV is the master reconnaissance UAV, the message transmitter 546 may transmit or broadcast the beacon message to the master reconnaissance UAVs. In case that the reconnaissance UAV is the member reconnaissance UAV, the message transmitter 546 may transmit the status reporting message including the reconnaissance UAV information to the master reconnaissance UAV.

The updater 547, which may be provided only for the master reconnaissance UAV though the present disclosure is not limited to, may update the flight schedule of the master reconnaissance UAV itself or the member reconnaissance UAV based on status reporting message after receiving the status reporting message from the member reconnaissance UAV during the UAV monitoring period.

The cooperative flight controller 548 may establish the wireless communication link between the master reconnaissance UAV and the member reconnaissance UAV for a cooperation of the plurality of reconnaissance UAVs. Also, the cooperative flight controller 548 may determine the missions of the master reconnaissance UAV and the member reconnaissance UAV based on the characteristics of reconnaissance UAVs such as sensor performances, capabilities of staying in the air, and computational capabilities. In an alternative embodiment, the functionalities of the cooperative flight controller 548 may be implemented in the ground control center or the UAV detection device in the ground control center rather than being implemented in the master reconnaissance UAV and may be performed through a cooperation with the master reconnaissance UAV The cooperative flight controller 548 may include a reconnaissance zone determiner 549A, a random number generator 549B, and a mapper 549C. The reconnaissance zone determiner 549A may set virtual segmentation borders to divide the UAV no-fly zone into a plurality of segmented monitoring zones based on a size, shape, and location of the UAV no-fly zone and the number of the reconnaissance UAVs in the UAV no-fly zone. Also, the reconnaissance zone determiner 549A may allocate one of the segmented monitoring zones to each of the plurality of reconnaissance UAVs. Further, the reconnaissance zone determiner 549A may determine the flight scheme of the reconnaissance UAV allocated to each segmented monitoring zone as either a grid scheme or a random walk scheme. The random number generator 549B may generate a random number to randomize a unit monitoring area or a monitoring grid corresponding to the unit monitoring area, or a unit flight duration in the unit monitoring area or the monitoring grid corresponding to the unit monitoring area. The mapper 549C may map the random number to the monitoring grid, the unit monitoring area, or the unit flight duration.

Figure 4A:
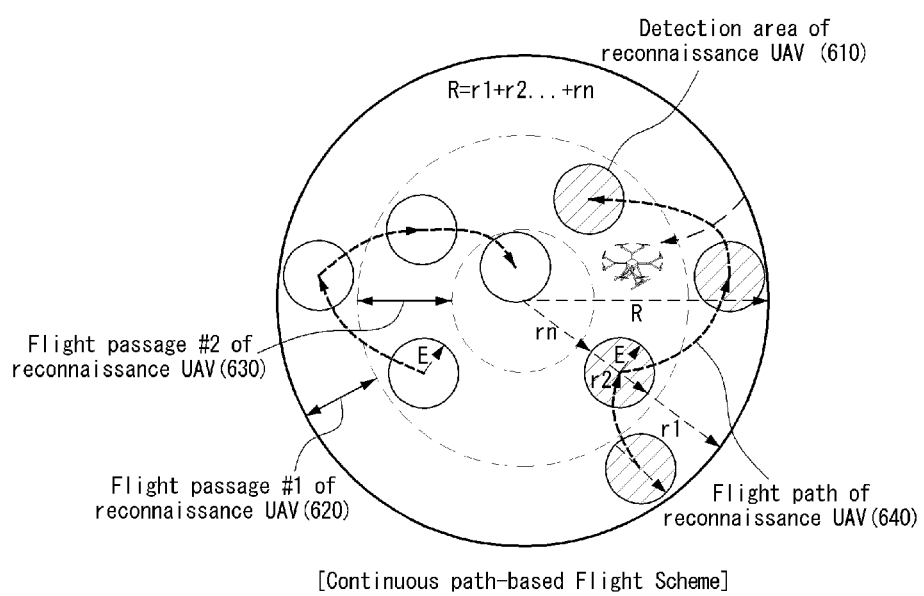
FIG. 4A illustrates a continuous path-based flight scheme of the reconnaissance UAV according to an exemplary embodiment of the present disclosure.
Figure 4B:
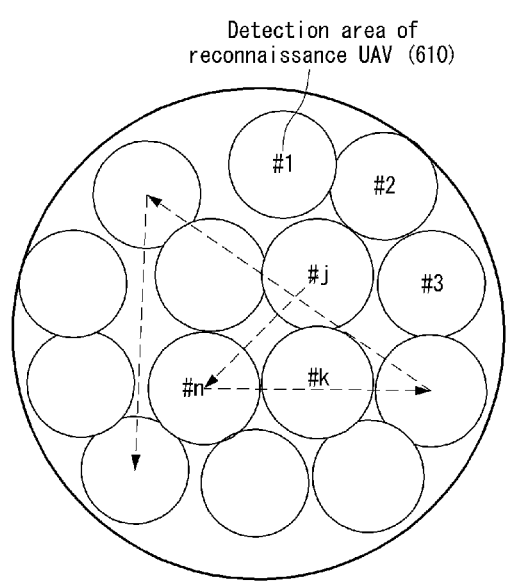
FIG. 4B illustrates a random path-based flight scheme of the reconnaissance UAV according to another exemplary embodiment of the present disclosure.

FIGS. 4A and 4B illustrate the flight schemes of the reconnaissance UAV according to exemplary embodiments of the present disclosure.

In order to increase a probability of detecting the unauthorized UAV and reduce the number of reconnaissance UAVs, the flight schemes of the reconnaissance UAV according to the exemplary embodiments shown in the drawings may include two flight schemes: a continuous path-based flight scheme in which the reconnaissance UAV flies in a prescribed manner or route and a random path-based flight scheme in which the reconnaissance UAV flies along a randomly adjusted path. The two flight schemes may be used selectively or in their combination.

In the continuous path-based flight scheme shown in FIG. 4A, the surveillance area of the reconnaissance UAV may be segmented into a plurality of flight passages including a first flight passage 620 and a second flight passage 630. In the embodiment shown in the drawing, the first flight passage 620 may be shaped in a ring having a first width r1, and the second flight passage 630 may be in contact with the first flight passage 620 along an inside edge of the first flight passage 620 and be shaped in a ring having a second width r2. The widths r1 and r2 of the first and second flight passages 620 and 630 may be approximate to a width of the detection area 610 of the reconnaissance UAV, but the present disclosure is not limited thereto. The other flight passages may be defined in a similar manner. Accordingly, all the flight passages may be arranged concentrically, and the surveillance area of the reconnaissance UAV may be a circular area of radius R which is an aggregation of all the flight passages. In the surveillance area, the reconnaissance UAV may be routed to fly in a zigzag form over two adjacent flight passages, e.g., the first and second flight passages 620 and 630. The flight path 640 of the reconnaissance UAV in the zigzag form may increase the detection probability of the unauthorized UAV having intruded the area.

In the random path-based flight scheme shown in FIG. 4B, the flight path of the reconnaissance UAV is determined randomly within the UAV no-fly zone, thereby increasing the detection probability of the intruding UAV. Accordingly, the detection area 610 of the reconnaissance UAV may be located at an arbitrary position at any time within the UAV no-fly zone. That is, the detection area 610 of the reconnaissance UAV for detecting the intruding UAV may be selected by a random walk. However, even in the random path-based UAV flight scheme, the UAV no-fly zone may be divided into small monitoring areas or grids, and the intruding UAV may be detected for each grid, e.g., #1, #2, #3, #j, #k, or #n denoted in FIG. 4B.

Figure 5:
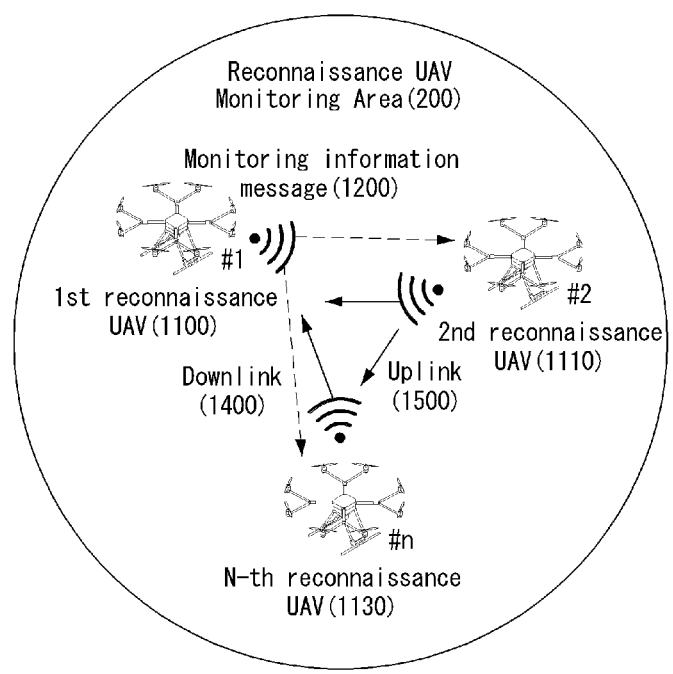
FIG. 5 illustrates communication links between the reconnaissance UAVs for a cooperative operation of the reconnaissance UAVs according to an exemplary embodiment of the present disclosure.

FIG. 5 illustrates communication links between the reconnaissance UAVs for a cooperative operation of the reconnaissance UAVs according to an exemplary embodiment of the present disclosure.

When a plurality of reconnaissance UAVs 1100, 1110, and 1130 are used to monitor the UAV no-fly zone, i.e., the reconnaissance UAV monitoring area 200, communication links may be established between the reconnaissance UAVs for a task assignment among the reconnaissance UAVs.

Assuming that a first reconnaissance UAV 1100 performs the role as the master reconnaissance UAV, the first reconnaissance UAV 1100 may broadcast a monitoring information message 1200 in the UAV no-fly zone through a downlink channel 1400.

The member reconnaissance UAVs including a second reconnaissance UAV 1100 through an N-th reconnaissance UAV 1130 may receive information of missions assigned to the corresponding reconnaissance UAV itself and the other reconnaissance UAVs through the monitoring information message 1200. The monitoring information message 1200 may be generated by the master reconnaissance UAV 1100 based on the report information provided by the member reconnaissance UAVs 1100-1130 through the uplink channel 1500. The report information may include the information about the type and performance specification of the mounted sensor, the position and the battery usage of the reconnaissance UAV.

The flight schedules of the reconnaissance UAVs may be generated collectively by the master reconnaissance UAV 1100. Alternatively, however, each reconnaissance UAV may generate its own flight schedule individually to transmit to the master reconnaissance UAV 1100 through the uplink channel, so that the master reconnaissance UAV 1100 may integrate the flight schedules from the member reconnaissance UAVs while adjusting at least some of the individual flight schedules of the member reconnaissance UAVs.

Figure 6:
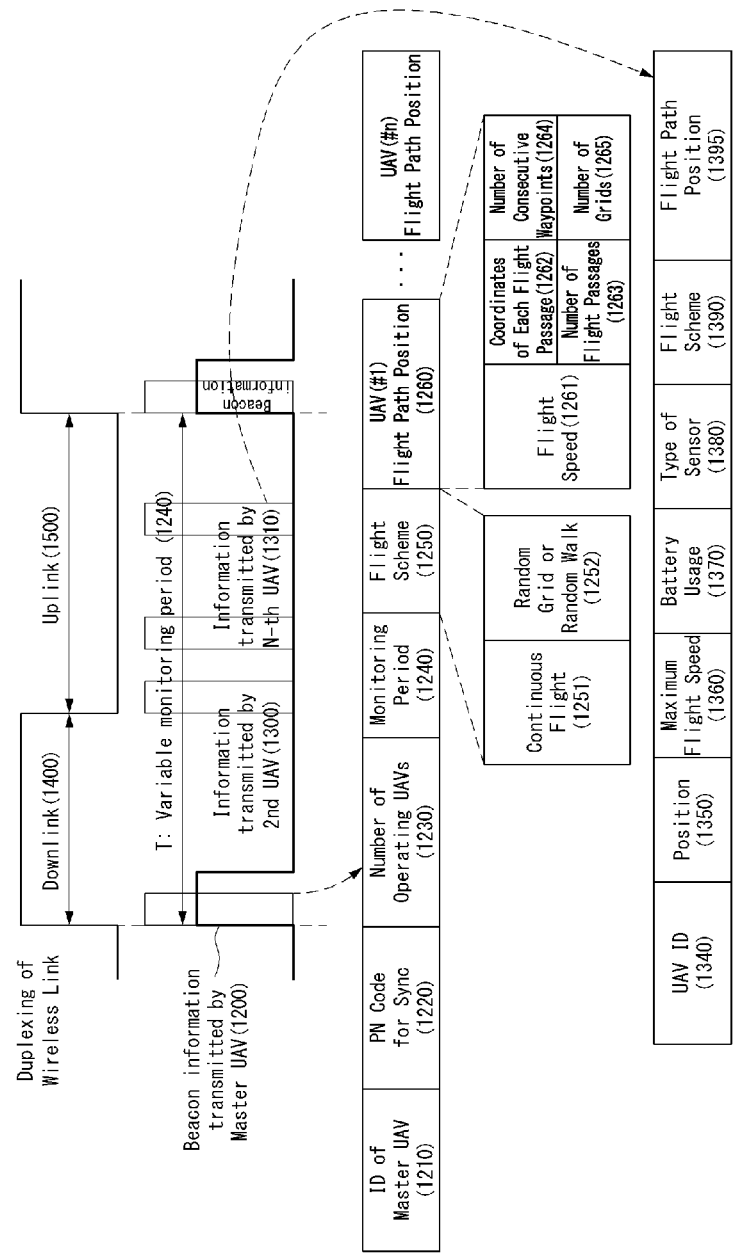
FIG. 6 depicts an example of a format of a flight information message for operating multiple reconnaissance UAVs according to an exemplary embodiment of the present disclosure.

FIG. 6 depicts an example of a format of the flight information message for operating multiple reconnaissance UAVs according to an exemplary embodiment of the present disclosure.

As mentioned above, the first reconnaissance UAV 1100 serving as the master reconnaissance UAV periodically transmits the beacon information 1200 during the downlink interval 1400. The member reconnaissance UAVs in the UAV no-fly zone acquire various information from the beacon information 1200. The master reconnaissance UAV may acquire the information required for generating the beacon information 1200 from status reporting messages 1300 and 1310 received from the member reconnaissance UAVs such as the second through the N-th reconnaissance UAVs during the uplink interval 1500. The communications between the master reconnaissance UAV and the member reconnaissance UAVs may work in half-duplex, in which only the master reconnaissance UAV may effectively send the information during the downlink interval while only member reconnaissance UAVs may effectively send information during the uplink interval, but the present disclosure is not limited thereto.

The beacon information 1200 transmitted by the master reconnaissance UAV may include an identification number 1210 of the master reconnaissance UAV, a PN sequence 1220 required to synchronize a timing of the master reconnaissance UAV with timings of the other reconnaissance UAVs, the number of the reconnaissance UAVs 1230 currently performing the surveillance operation in the UAV no-fly zone, the monitoring period 1240 for each reconnaissance UAV to monitor the UAV no-fly zone, the flight scheme designated for the reconnaissance UAVs such as the continuous path-based flight 1251 and the random grid or random walk flight 1252, and flight path position information 1260. The flight path position information 1260 may include the flight speed 1261 that each reconnaissance UAV must abide by during the monitoring period 1240, coordinates of each flight passage 1262 used for the continuous path-based flight, a number of flight passages 1263 to be covered in a unit time, and a number of consecutive waypoints 1264 or a number of grids 1265 to be covered in a unit time in case of the random grid or random walk flight.

The status reporting messages 1300 and 1310 transmitted by each of the member reconnaissance UAVs to the master reconnaissance UAV during the uplink interval 1500 may include an identification number of the reconnaissance UAV 1340, a position of the reconnaissance UAV 1350, a maximum flight speed of the reconnaissance UAV 1360, the battery usage 1370 indicating an available flight time of the reconnaissance UAV, and types of sensors mounted in the reconnaissance UAV 1380. In case that the flight schedule is generated by the plurality of reconnaissance UAVs in a distributed manner, the messages 1300 and 1310 may further include the flight scheme of the reconnaissance UAV 1390 and the flight path position information 1395.

In order to generate the flight schedule in a distributed manner, the master reconnaissance UAV may provide each of the member reconnaissance UAVs in advance with information about the mission of the corresponding member reconnaissance UAV, e.g., the information on the monitoring area allocated to the member reconnaissance UAV.

Figure 7A:
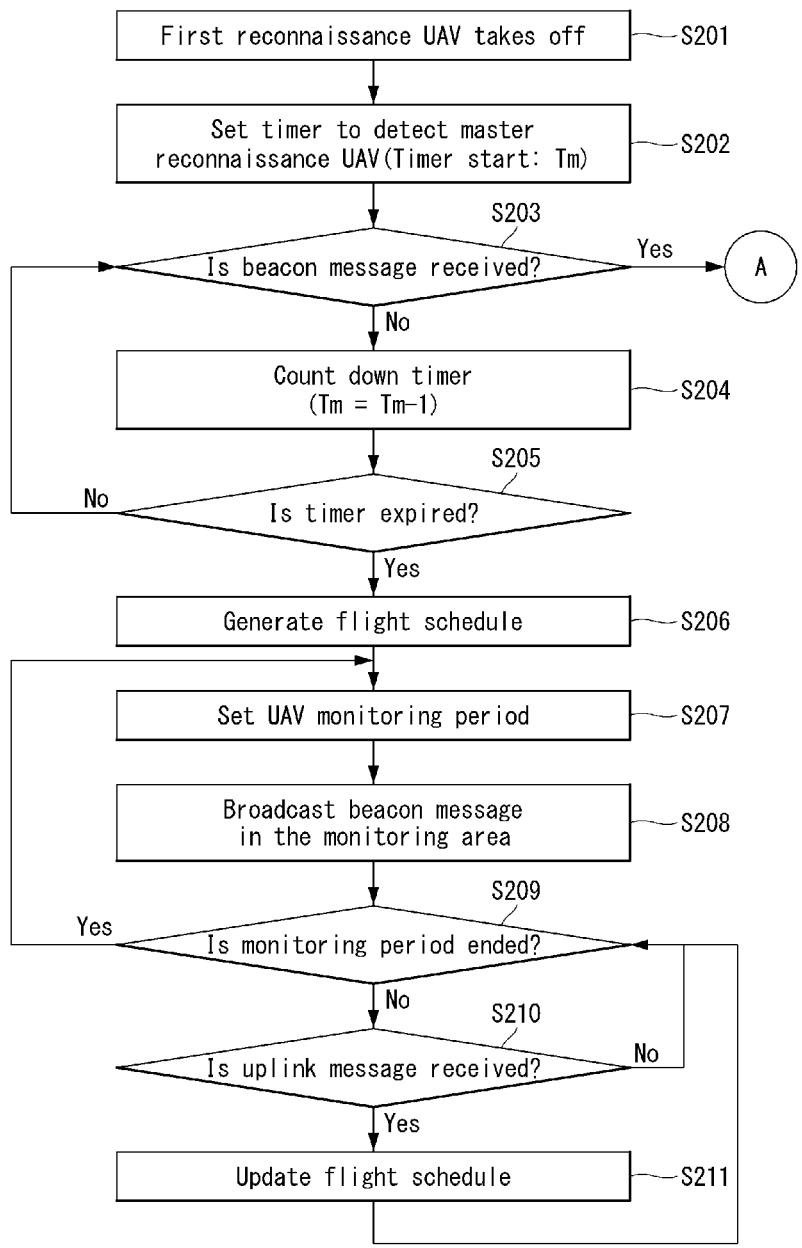
FIGS. 7A and 7B are flowcharts illustrating a process of performing a surveillance flight according to an exemplary embodiment of the present disclosure.
Figure 7B:
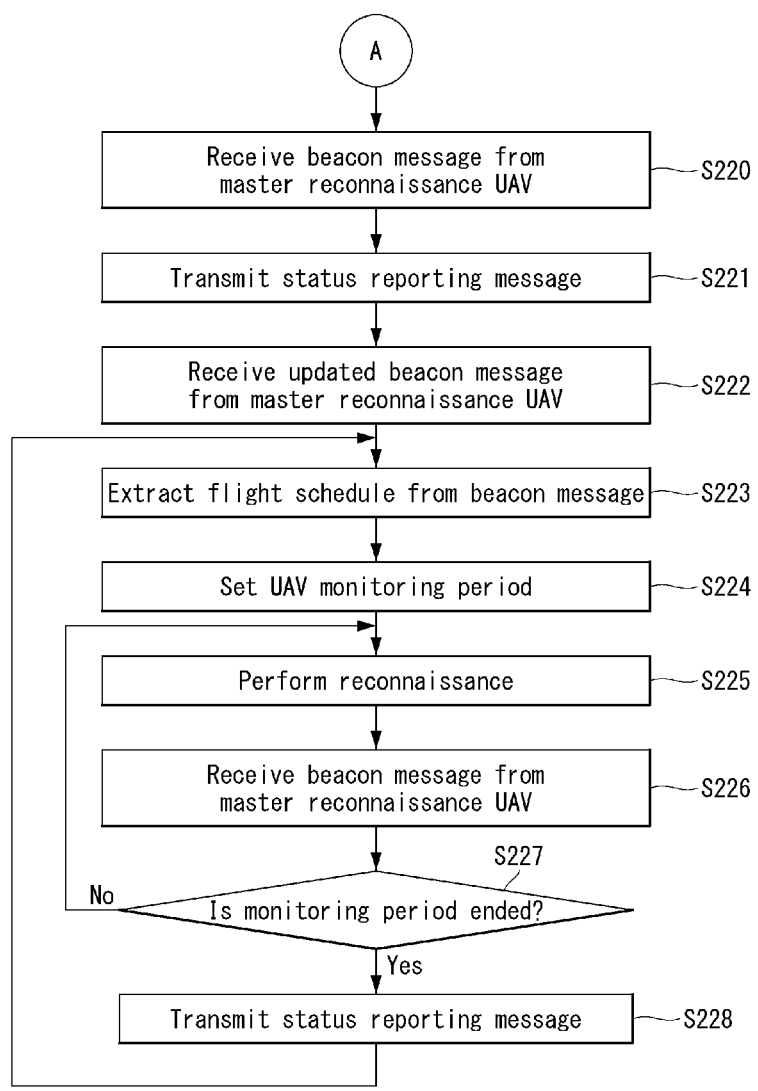

FIGS. 7A and 7B are flowcharts illustrating a process that the reconnaissance UAV performs the surveillance flight according to an exemplary embodiment of the present disclosure. The process shown in the drawings are suitable for monitoring the intrusion of the unauthorized UAV into the UAV no-fly zone by using a plurality of reconnaissance UAVs. In the present embodiment, the first reconnaissance UAV 1100 may generate the flight schedule for the plurality of reconnaissance UAVs.

Referring to FIG. 7A, the first reconnaissance UAV having taken off and entering the monitoring area may set a timer to check whether another reconnaissance UAV is serving as the master reconnaissance UAV in the monitoring area (S201 and S202).

Next, the reconnaissance UAV monitors whether the beacon message is received from a master reconnaissance UAV (S203). The monitoring of the beacon message is repeatedly carried out while counting an elapsed time by use of the timer (S203-S205). In case that the first reconnaissance UAV does not receive the beacon message before the timer expires in operation S205, the first reconnaissance UAV determines that the master reconnaissance UAV does not exist in the monitoring area, and the first reconnaissance UAV becomes the master reconnaissance UAV and performs operations S206 through S211. Meanwhile, if the beacon message is received before the timer expires, the first reconnaissance UAV becomes the member reconnaissance UAV, and the procedure proceeds to an operation S220 shown in FIG. 7B.

The first reconnaissance UAV may generate the flight schedule for monitoring the intrusion of the unauthorized UAV in the monitoring area as the master reconnaissance UAV (S206), and may set the UAV monitoring period (S207). The master reconnaissance UAV may broadcast the beacon message in the monitoring area (S208).

Afterwards, the master reconnaissance UAV may check whether any message or report information from the member reconnaissance UAV is received during the uplink interval during the UAV monitoring period (T) (S210). If there is any message or report information from the member reconnaissance UAV received during the uplink interval, the master reconnaissance UAV may update the flight schedule based on the received information. The operations S210 and S211 is repeatedly carried out until the UAV monitoring period ends in operation S209. After the UAV monitoring period ends in the operation S209, the master reconnaissance UAV may perform the operation S207 again to reset the UAV monitoring period (T) based on the flight schedules of the master reconnaissance UAVs and repeat the operations S208-S211.

On the other hand, in case that the beacon message is received in the operation S203 before the timer expires, the first reconnaissance UAV becomes the member reconnaissance UAV, and the procedure proceeds to the operation S220 shown in FIG. 7B. Referring to FIG. 7B, the first reconnaissance UAV may receive and analyze the beacon message from the master reconnaissance UAV as the member reconnaissance UAV (S220). Subsequently, the first reconnaissance UAV may transmit the status reporting message to the master reconnaissance UAV during the uplink interval (S221). The status reporting message may contain characteristics and status of the first reconnaissance UAV including the maximum flight speed, the position, and the battery usage. Upon receiving the status reporting message, the master reconnaissance UAV may generate the beacon message and broadcast the beacon message during the downlink interval.

The first reconnaissance UAV may receive an updated beacon message during the downlink interval (S222), extract the flight schedule from the received beacon message (S223), set the UAV monitoring period according to the flight schedule (S224), and perform the reconnaissance based on the flight schedule and the UAV monitoring period (S225). During the reconnaissance flight operation, the first reconnaissance UAV may continue to receive the beacon message from the master reconnaissance UAV (S226). The operations S223 through S226 may be repeatedly performed until the monitoring period ends.

After the monitoring period ends in the operation S227, the first reconnaissance UAV may transmit the status reporting message including the characteristics and status of the first reconnaissance UAV such as the maximum flight speed, the position, and the battery usage to the master reconnaissance UAV during the uplink interval (S228). Afterwards, the first reconnaissance UAV may extract the flight schedule from the beacon message beacon message again (S223) to perform the operations S224 through S228 again.

The reconnaissance flight process of the first reconnaissance UAV as the master reconnaissance UAV or the member reconnaissance UAV shown in FIGS. 7A and 7B may terminate when a predetermined process termination event occurs during the reconnaissance flight operation. After the completion of the reconnaissance flight mission, the reconnaissance UAV may return to its take-off position.

Figure 8:
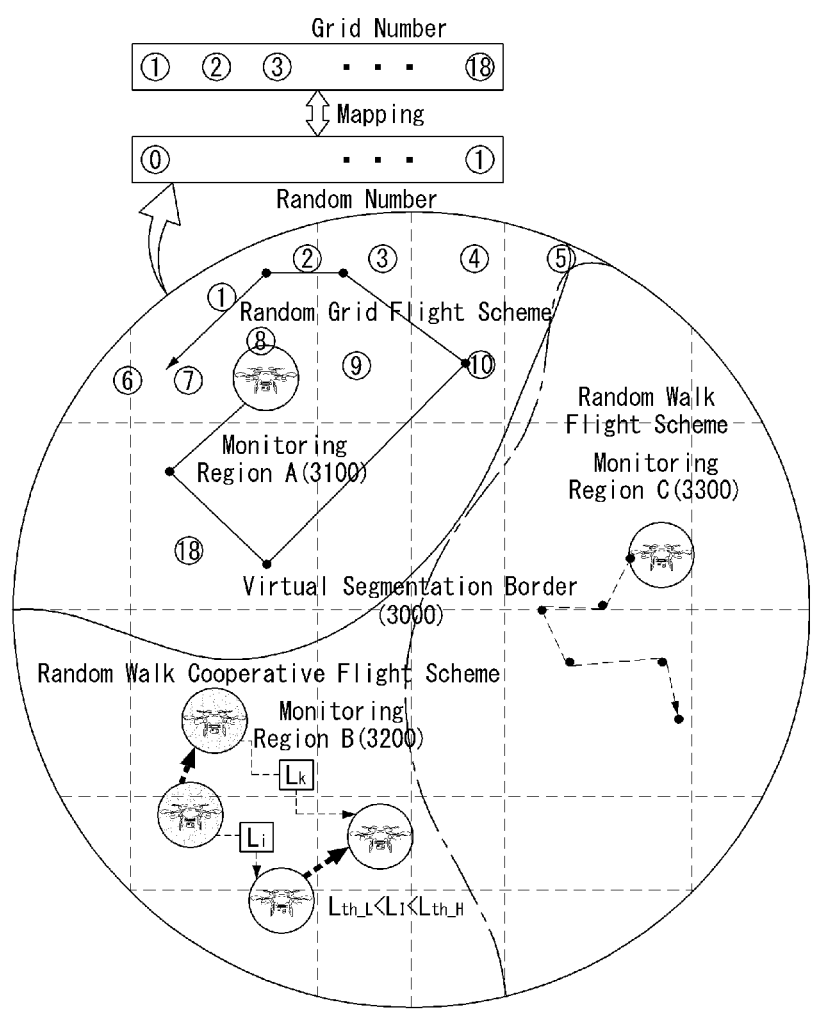
FIG. 8 illustrates examples of the surveillance flights of the reconnaissance UAVs according to an exemplary embodiment of the present disclosure.

FIG. 8 illustrates examples the surveillance flights of the reconnaissance UAVs according to an exemplary embodiment of the present disclosure.

In the present example, the UAV no-fly zone is monitored using four reconnaissance UAVs. When the UAV no-fly zone is monitored using a plurality of reconnaissance UAVs as in the example of FIG. 8, the UAV no-fly zone may be divided into a plurality of segmented monitoring areas. Each of the monitoring areas may be allocated to at least one reconnaissance UAV and a flight schedule may be generated for each of the monitoring areas.

In order to divide the UAV no-fly zone into the plurality of segmented monitoring areas, at least one virtual segmentation border may be set in the UAV no-fly zone based on the size, shape, and location of the UAV no-fly zone, the number of the reconnaissance UAVs, and the characteristics of the reconnaissance UAVs such as the performance of the mounted sensor, available flight time, and the flight scheme. In the present embodiment, it is assumed that the UAV no-fly zone divided into three segmented monitoring areas, i.e., monitoring areas A-C 3100 through 3300, and the three segmented monitoring areas are monitored by four reconnaissance UAVs.

In the example, the monitoring area A 3100 may be monitored by a single reconnaissance UAV flying in the random grid flight scheme. The monitoring area A is divided into grids of a certain size designated by circled letters ① through ⑩ and so on. The reconnaissance UAV may be randomly placed on one of the grids to monitor the grid area, and then moved to another grid which is randomly selected so as to monitor the new grid area. Such a process is repeatedly performed for the entire segmented monitoring areas. In an example of the random selection of the grid, a random number may be generated and then a grid having a grid number which is mapped in advance to the random number may be selected as the randomly selected grid.

The monitoring area B 3200 may be monitored by two reconnaissance UAVs flying in the random grid or random walk flight scheme. The distance Li between the grids or monitoring areas of the two reconnaissance UAVs or the distance between the positions of two reconnaissance UAVs $L_k$ may be controlled to be within a range between a certain lower limit threshold $L_{th\_L}$ and a certain upper limit threshold $L_{th\_H}$. Accordingly, the overlap of monitoring areas of the reconnaissance UAVs may be reduced and the detection blind area may be minimized. This flight scheme is suitable for quickly monitoring the segmented monitoring area while minimizing overlaps of the detection areas of the reconnaissance UAVs.

The monitoring area C 3300 may be monitored by a single reconnaissance UAV flying in the random walk flight scheme. After performing the surveillance operation at an arbitrary position at a time, the reconnaissance UAV may randomly determine a next monitoring position in the monitoring area. This monitoring scheme, however, may be operated such that a potential overlap between a former and later detection areas of the reconnaissance UAV may be limited until a size of entire monitored area occupies a certain portion of the monitoring area of the reconnaissance UAV.

Figure 9:
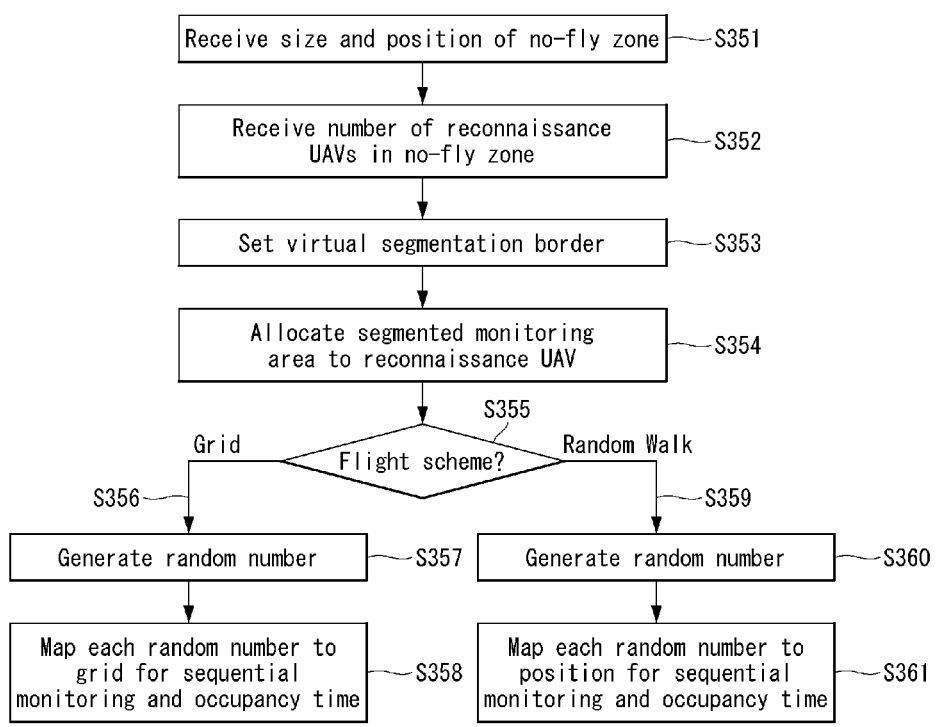
FIG. 9 is a flowchart showing a process of allocating monitoring areas and setting a flight path according to an exemplary embodiment of the present disclosure.

FIG. 9 is a flowchart showing a process of allocating the monitoring area and setting the flight path according to the flight scheme of the reconnaissance UAV in accordance with an exemplary embodiment of the present disclosure.

The controller of the master reconnaissance UAV may receive the size and position of the UAV no-fly zone (S351). Also, the controller of the master reconnaissance UAV may receive or determine the number of the reconnaissance UAVs in the no-fly zone (S352). Next, the controller of the master reconnaissance UAV may set the virtual segmentation border (S353) based on the size and position of the UAV no-fly zone, the number of the reconnaissance UAVs, and the characteristics of each reconnaissance UAV such as the types and performances of the mounted sensors, the flight speed, the available flight time, a power consumption per unit time, and so on included in the status reporting message from the member reconnaissance UAVs. Further, the controller of the master reconnaissance UAV may allocate segmented monitoring areas to the reconnaissance UAVs (S354).

Subsequently, the flight schedules of the reconnaissance UAVs may be determined based on the flight schemes of the reconnaissance UAVs, e.g., the random grid flight scheme or the random walk flight scheme (S355). In case of the random grid flight scheme (S356), the random numbers may be generated sequentially (S357) and the random numbers may be mapped to the grids for sequential monitoring and respective occupancy times (S358). An occupancy time in which each grid is monitored may be set also. In the case of the random walk flight scheme (S359), the random numbers may be generated sequentially (S360) and the random numbers may be mapped to the monitoring positions for sequential monitoring and respective occupancy times (S361).

According to the exemplary embodiments described above, it is possible to effectively monitor the unauthorized UAV by using the image and noise sensors to protect the human lives and properties from the intruding UAV. In particular, the present disclosure enables to reduce the number of cameras and the noise sensors required for monitoring the intruding UAV, thereby reducing the number of the reconnaissance UAVs.

The apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A surveillance flight method of a reconnaissance unmanned aerial vehicle (UAV) for detecting an unauthorized UAV, comprising:

defining multiple flight passages in a UAV no-fly zone for a plurality of reconnaissance UAVs;

controlling each of the plurality of reconnaissance UAVs to fly across adjacent flight passages at a time interval by crossing a border of the adjacent flight passages, and controlling at least one of an image sensor and a noise sensor mounted on the each of the plurality of the reconnaissance UAVs to change a detection direction thereof;

transmitting, by a master reconnaissance UAV among the plurality of reconnaissance UAVs, a beacon message to at least one of a member reconnaissance UAV other than the master reconnaissance UAV, the beacon message comprising a first information about an identification number of the master reconnaissance UAV, a pseudo-noise PN sequence required to synchronize a timing of the master reconnaissance UAV with a timing of the member reconnaissance UAV, a total number of the reconnaissance UAVs currently performing an surveillance operation in the UAV no-fly zone, a monitoring period, flight schemes, and flight path positions of the plurality of reconnaissance UAVs; and receiving, by the master reconnaissance UAV, a status reporting message during an uplink interval from the member reconnaissance UAV that analyzes the beacon message, the status reporting message comprising a second information about an identification number, the flight path position, a maximum flight speed, a state of charge of a battery, types of mounted sensors, a flight scheme, and a flight path position of the member reconnaissance UAV.

2. The surveillance flight method of claim 1, further comprising:

receiving, by the master reconnaissance UAV, a second status reporting message during an uplink interval from another member reconnaissance UAV that analyzes the beacon message, the second status reporting message comprising the second information about the identification number, the flight path position, the maximum flight speed, the state of charge of the battery, types of mounted sensors, the flight scheme, and the flight path position of the member reconnaissance UAV.

3. The surveillance flight method of claim 2, further comprising:

generating, by the master reconnaissance UAV, a flight schedule comprising a mission or the flight scheme and the flight path of the member reconnaissance UAV based on the second information received from the member reconnaissance UAV to transmit to the member reconnaissance UAV.

4. A reconnaissance UAV for detecting an unauthorized UAV, comprising:

an image sensor including at least one of an optical camera, a digital camera, a thermal imaging camera, or a combination thereof;

a noise sensor including a microphone, an acceleration sensor, or a combination thereof;

an actuator configured to control a position of at least one of the image sensor and the noise sensor;

a wireless communication device configured to communicate with another reconnaissance UAV or a ground control center; and a controller configured to control an operation of the reconnaissance UAV to fly along a predetermined flight path in a UAV no-fly zone, control operations of the image sensor, the noise sensor, the actuator, and the wireless communication device, and detect the unauthorized UAV in the UAV no-fly zone based on information collected through the image sensor or the noise sensor;

a message receiver configured to receive a status reporting message from a member reconnaissance UAV other than a master reconnaissance UAV among a plurality of reconnaissance UAVs;

a flight schedule generator configured to generate a flight schedule of the member reconnaissance UAV based on the status reporting message;

a monitoring period setter configured to set a monitoring period for performing the reconnaissance flight in the UAV no-fly zone;

a message transmitter configured to broadcast the flight schedule and the monitoring period through a beacon message, the beacon message comprising a first information about an identification number of the master reconnaissance UAV, a pseudo-noise PN sequence required to synchronize a timing of the master reconnaissance UAV with a timing of the member reconnaissance UAV, a total number of the reconnaissance UAVs currently performing an surveillance operation in the UAV no-fly zone, a monitoring period, flight schemes, and flight path positions of the plurality of reconnaissance UAVs; and an updater configured to update the flight schedule based on the status reporting message from the member reconnaissance UAV during the monitoring period.

5. The reconnaissance UAV of claim 4, wherein the controller sets a role of the reconnaissance UAV as the master reconnaissance UAV in case of receiving a beacon message within a preset time when the reconnaissance UAV first enters the UAV no-fly zone while setting the role of the reconnaissance UAV as the member reconnaissance UAV in case of not receiving the beacon message within a preset time when the reconnaissance UAV first enters the UAV no-fly zone.

6. The reconnaissance UAV of claim 5, further comprising:

a cooperative flight controller configured to control a cooperative flight of a plurality of reconnaissance UAVs and comprising a virtual segmentation border determiner suitable for setting at least one virtual segmentation border to divide the UAV no-fly zone into a plurality of monitoring areas.

7. The reconnaissance UAV of claim 6, wherein the cooperative flight controller comprises:

a random number generator configured to generate a random number for setting grids or monitoring positions for sequentially monitoring each of the monitoring areas divided by the virtual segmentation border; and a mapper configured to map the random number to an occupancy time for monitoring the grids or the monitoring positions.

8. A reconnaissance UAV for detecting an unauthorized UAV comprising:

an image sensor including at least one of an optical camera, a digital camera, a thermal imaging camera, or a combination thereof;

a noise sensor including a microphone, an acceleration sensor, or a combination thereof;

an actuator configured to control a position of at least one of the image sensor and the noise sensor;

a wireless communication device configured to communicate with another reconnaissance UAV or a ground control center; and a controller configured to control an operation of the reconnaissance UAV to fly along a predetermined flight path in a UAV no-fly zone, control operations of the image sensor, the noise sensor, the actuator, and the wireless communication device, and detect the unauthorized UAV in the UAV no-fly zone based on information collected through the image sensor or the noise sensor;

a message receiver configured to receive a beacon message from a master reconnaissance UAV among a plurality of reconnaissance UAVs;

a message transmitter configured to transmit the status reporting message including information about the reconnaissance UAV to the master reconnaissance UAV;

a flight schedule extractor configured to extract the flight schedule from the beacon message received from the master reconnaissance UAV; and a monitoring period setter configured to set a monitoring period for performing the reconnaissance flight based on the beacon message.

* * * * *